3,303,228
PRODUCTION OF CYCLODODECENE
Kenneth E. Atkins, South Charleston, and Marion A. Eccles, Nitro, W. Va., assignors to Union Carbide Corporation, a corporation of New York
No Drawing. Filed Aug. 6, 1965, Ser. No. 477,939
4 Claims. (Cl. 260—666)

This invention is concerned with an improved process for producing cyclododecene from 1,5,9-cyclododecatriene. More particularly, this invention is concerned with a method for hydrogenating 1,5,9-cyclododecatriene employing dicobalt octacarbonyl as a catalyst.

Cyclododecene is a valuable intermediate for a number of potentially valuable commercial products. For example, it can be converted by ozonolysis to 1,12-dodecanedioic acid which, in turn, has utility as a monomer for polyamides, i.e., nylons. Cyclododecene can also be converted to laurolactam, another nylon precursor, via (1) an oxo reaction, oxidation of the oxo product (cyclododecylmethanal and hydroxymethylcyclododecane) to cyclododecane carboxylic acid and reaction of the acid with nitrosylsulfuric acid, or (2) reaction of cyclododecene with nitrosyl chloride, hydrogenolysis of the resulting chlorooxime to form cyclodecanone oxime and rearrangement of the oxime to laurolactam.

In addition, cyclododecane carboxylic acid has been reported to be a pesticide (Belgian Patent 631,146) and its esters are known as plasticizers.

Recently, it was discovered that dicobalt octacarbonyl selectively catalyzes the batchwise hydrogenation of cyclododecatriene to cyclododecene. For example, cyclododecatriene containing about 4 weight percent dicobalt octacarbonyl and under a hydrogen pressure of 3000 p.s.i.g. can be converted at 130° C. to cyclododecene of about 87–9 percent purity in about 2 hours. It has been further discovered, however, that this is the maximum purity which can be obtained in a batch process at commercially-acceptable reaction rates, although cyclododecene can be obtained in about 95 percent purity in over 10 hours at 140° C. and 500 p.s.i.g. hydrogen pressure.

The precise reason for these observations is not definitely established. However, we have found that dicobalt octacarbonyl is not the active catalyst, as is indicated by an induction period prior to the absorption of hydrogen. Although the identity of the active species have not been established, it has been found by infrared analysis of the reaction mixture that during the induction period absorption bands appear at $4.89\mu$, $5.05\mu$ and $5.38\mu$. When these bands are sufficiently prominent selective hydrogenation to cyclododecene occurs. The amount of cyclododecene in the reaction mixture increases with time to a maximum and then decreases with a corresponding increase in the amount of cyclododecane. It is believed that the decrease in the amount of cyclododecene is due to the reduction of the active species of the dicobalt octacarbonyl catalyst to elemental cobalt, which catalyzes the hydrogenation of cyclododecene to cyclododecane. It is further believed that elevated temperatures and hydrogen pressures and high hydrogen to cyclododecatriene ratios accelerate the reduction of the active cobalt catalyst to elemental cobalt and, thus, the rate of formation of cyclododecane.

It has been unexpectedly and surprisingly discovered by this invention that elevated temperatures and hydrogen pressures and high hydrogen to cyclododecatriene ratios can be employed, and, in fact, are necessary to produce high purity cyclododecene by a continuous process wherein the residence time at the reaction conditions is controlled within fairly well defined limits, normally between about 1 minute and about 10 minutes. Thus, the process of this invention comprises continuously feeding cyclododecatriene containing at least about 5 weight percent dicobalt octacarbonyl and hydrogen to an elongated reaction zone which is maintained at a temperature of at least about 150° C. and a total pressure of at least 1000 p.s.i.g. maintaining the reaction mixture in the reaction zone for a period of time of at least about 1 minute, but less than about 10 minutes, and then withdrawing the reaction mixture. The reaction is terminated by either reducing the temperature to, for example, below about 100 C. and/or reducing the pressure to, for example, below about 1000 p.s.i.g. By operating in this manner we are able to rapidly hydrogenate the cyclododecatriene to cyclododecene before significant amounts of elemental cobalt and, thus, cyclododecane can be formed.

The amount of dicobalt octacarbonyl should be at least 5 weight percent, based upon cyclododecatriene, to provide sufficiently rapid reaction rates to hydrogenate cyclododecatriene to cyclododecene before significant amounts of elemental cobalt are formed. Amounts of at least about 8 percent, for example 10 percent, are preferred. The maximum amount of dicobalt octacarbonyl is not highly critical to this invention, but an amount of about 15 weight percent is considered to be an economically feasible upper limit.

It is important that essentially pure dicobalt octacarbonyl be employed. For example, dicobalt octacarbonyl is sensitive to air, and visibly decomposes giving a violet precipitate from its solution in toluene. Dicobalt octacarbonyl is also known to form black crystals of tetracobalt dodecacarbonyl. The presence of either of these products, like the presence of elemental cobalt, results in the formation of cyclododecane. It is thus necessary to "activate" dicobalt octacarbonyl by heating at elevated temperatures (100 to 250° C.) and pressures (1000 to 10,000 p.s.i.g.) under a carbon monoxide and hydrogen atmosphere ($CO:H_2$ ratio of 0.1:1 to 10:1). The activated catalyst can then be stored under a carbon monoxide atmosphere prior to use.

Elevated temperatures of at least 150° C. and elevated pressures of at least 1000 p.s.i.g. are essential to provide the high reaction rates necessary to convert the cyclododecatriene to cyclododecene before significant amounts of the cobalt catalyst can be reduced to elemental cobalt. Although the maximum pressure is not highly critical to this invention, and can range as high as 5000 p.s.i.g. or higher if desired, it is preferred to employ pressures in the range of from about 2000 to about 3000 p.s.i.g. On the other hand, the maximum temperature is somewhat critical to this invention, for the rate of formation of cyclododecane increases at a much faster rate with increasing temperature than does the rate of formation of cyclododecene. Thus, the maximum temperature should not exceed about 250° C. Temperatures in the range of from about 175° C. to about 200° C. are preferred.

The residence time in the reaction zone is in the range of 1 to 10 minutes, and will vary depending upon the severity of the reaction conditions. That is, shorter residence times should be employed with increasing temperatures and/or pressures. The essential criterion is that the reaction mixture should be withdrawn from the reaction zone before elemental cobalt is formed.

The cyclododecatriene can be pure, or it can be fed in admixture with inert diluents or solvents, such as aromatic or saturated aliphatic or cycloaliphatic hydrocarbons, as desired. Alcohols, such as ethanol, cannot be employed as solvent because they inhibit the hydrogenation.

The process of this invention can be conducted in one or more steps, provided that the reaction mixture is promptly cooled or the pressure is released, the spent catalyst removed and fresh catalyst is added prior to feeding to successive steps. If a multi-step process is employed, the reaction conditions in the succeeding steps should be similar to those employed in the first step, except that the amount of catalyst in the subsequent steps can be below 5 weight percent, and may be as little as 1 percent or even less, based upon all cyclo-$C_{12}$ species. When two or more steps are employed, it is preferred that the catalyst be removed from the product of each step and fresh catalyst be added before effecting the subsequent step. In this manner, the presence of any elemental cobalt which may have formed in the preceding step is avoided in the subsequent step.

Spent catalyst is readily recovered from the reaction mixture by distillation, with the catalyst being recovered as a residue. The catalyst, after regeneration, may be recycled.

It is preferred that the conversion of cyclododecatriene be carried to at least 90 percent, and preferably at least 95 percent, to ensure the requisite purity of cyclododecene for subsequent reactions.

The reactor employed for effecting the process of this invention is not narrowly critical, provided it permits good control of temperature and residence time and provides good mixing of the feed components. Thus, pot-type reactors cannot be employed. In general, a tubular reactor having a diameter narrow enough to provide plug flow conditions and to substantially suppress back mixing is preferred. The length of the reactor is not highly critical but the reactor obviously should be long enough to provide the desired residence time.

The following examples are illustrative.

*Example 1*

A mixture of 81 milliliters of 1,5,9-cyclododecatriene and 39 milliliters of a toluene solution containing 21.8 weight percent dicobalt octacarbonyl was continuously fed at a rate of 480 milliliters per hour to a reactor comprising a $9/16$-inch O.D. by $3/16$-inch I.D. stainless steel coil having a volume of 83 cubic centimeters. Hydrogen, at a pressure of 2500 p.s.i.g., was also continuously fed to the reactor, and was vented at a rate of 9 standard cubic feet per hour, providing a maximum residence time of about 1.8 minutes. The reactor was submerged in an oil bath, which was maintained at a temperature of 185° C. The reaction product, which weighed 94 grams, was analyzed by vapor phase chromatography and found to contain 82.5 percent cyclododecene, 7.7 percent cyclododecatriene, 7.5 percent cyclododecadiene and 2.3 percent cyclododecane.

*Example 2*

Employing the reactor described in Example 1, a mixture of 24 milliliters of partially-hydrogenated cyclododecatriene containing 82.9 percent cyclododecene, 10.2 percent cyclododecatriene, 5.8 percent cyclododecadiene and 1.1 percent cyclododecane and 11 milliliters of an 18.5 percent solution of dicobalt octacarbonyl in toluene was fed at a rate of 540 cubic centimeters per hour. Hydrogen was fed at a pressure of 2500 p.s.i.g. and vented at a rate of 10 cubic feet per hour, providing a maximum residence time of about 1.6 minutes. The reactor was maintained at 185° C. The product contained 93.7 percent cyclododecene, 3.5 percent cyclododecatriene and 2.8 percent cyclododecane.

What is claimed is:

1. In a process for producing cyclododecene by the hydrogenation of 1,5,9-cyclododecatriene, the improvement of continuously feeding 1,5,9-cyclododecatriene containing at least 5 weight percent dicobalt octacarbonyl and hydrogen to an elongated reaction zone maintained at a temperature of 150° C. to 250° C. and a pressure of 1000 p.s.i.g to 5000 p.s.i.g., maintaining the reaction mixture in the reaction zone for a period of from 1 to 10 minutes but before the formation of elemental cobalt, and thereafter removing the reaction mixture from said reaction zone.

2. The process as claimed in claim 1 wherein said process is conducted in at least two reaction zones, with spent cobalt catalyst being removed from the reaction mixture from each reaction zone and fresh dicobalt octacarbonyl in an amount of at least 1 weight percent, based on cyclo-$C_{12}$ species in the reaction mixture, being added to said reaction mixture prior to being fed to the subsequent reaction zone.

3. The process as claimed in claim 1 wherein the amount of dicobalt octacarbonyl is at least 8 weight percent, based upon cyclododecatriene, the temperature is in the range of from about 175° C. to about 200° C. and the pressure is in the range of from about 2000 p.s.i.g. to about 3000 p.s.i.g.

4. The process as claimed in claim 2 wherein the amount of dicobalt octacarbonyl fed to the first reaction zone is at least 8 weight percent, based upon cyclododecatriene, and is at least 1 weight percent, based upon cyclo-$C_{12}$ species in any subsequent reaction zone, the temperature is in the range of from about 175° C. to about 200° C. and the pressure is in the range of from about 2000 p.s.i.g. to about 3000 p.s.i.g.

References Cited by the Examiner

Thomas Rull: Societe Chimique de France, Bulletin, Ser. 5, pp. 2680–2683, October 1964.

DELBERT E. GANTZ, *Primary Examiner.*

V. O'KEEFE, *Assistant Examiner.*